(12) United States Patent
You

(10) Patent No.: US 9,185,285 B2
(45) Date of Patent: Nov. 10, 2015

(54) METHOD AND APPARATUS FOR ACQUIRING PRE-CAPTURED PICTURE OF AN OBJECT TO BE CAPTURED AND A CAPTURED POSITION OF THE SAME

(75) Inventor: Ju-yeon You, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 13/272,295

(22) Filed: Oct. 13, 2011

(65) Prior Publication Data

US 2012/0127327 A1 May 24, 2012

(30) Foreign Application Priority Data

Nov. 24, 2010 (KR) .................. 10-2010-0117289

(51) Int. Cl.
| | |
|---|---|
| H04N 5/222 | (2006.01) |
| H04N 5/232 | (2006.01) |
| H04N 1/32 | (2006.01) |
| H04N 5/228 | (2006.01) |
| H04N 1/00 | (2006.01) |
| H04N 101/00 | (2006.01) |

(52) U.S. Cl.
CPC ....... *H04N 5/23222* (2013.01); *H04N 1/00442* (2013.01); *H04N 1/32101* (2013.01); *H04N 1/00244* (2013.01); *H04N 1/00323* (2013.01); *H04N 2101/00* (2013.01); *H04N 2201/0055* (2013.01); *H04N 2201/0084* (2013.01); *H04N 2201/3253* (2013.01); *H04N 2201/3273* (2013.01); *H04N 2201/3278* (2013.01)

(58) Field of Classification Search
CPC .......... H04N 5/23222; H04N 1/00442; H04N 1/32101
USPC .............................. 348/222.1, 333.02, 333.12
See application file for complete search history.

(56) References Cited

U.S. PATENT DOCUMENTS

| | | | | |
|---|---|---|---|---|
| 7,440,595 | B2 * | 10/2008 | Kohno | 382/118 |
| 7,656,429 | B2 * | 2/2010 | Larson | 348/208.14 |
| 8,194,986 | B2 * | 6/2012 | Conwell | 382/224 |
| 8,238,693 | B2 * | 8/2012 | Nurminen et al. | 382/286 |
| 8,319,952 | B2 * | 11/2012 | Otani et al. | 356/5.04 |
| 8,363,900 | B2 * | 1/2013 | Huang | 382/107 |
| 8,405,754 | B2 * | 3/2013 | Sakakima et al. | 348/333.05 |
| 8,560,517 | B2 * | 10/2013 | Yang et al. | 707/708 |
| 2001/0015759 | A1 * | 8/2001 | Squibbs | 348/232 |
| 2005/0264668 | A1 * | 12/2005 | Miyamoto | 348/333.11 |
| 2007/0030363 | A1 * | 2/2007 | Cheatle et al. | 348/239 |
| 2007/0188626 | A1 * | 8/2007 | Squilla et al. | 348/222.1 |
| 2009/0083275 | A1 * | 3/2009 | Jacob et al. | 707/10 |
| 2009/0105945 | A1 * | 4/2009 | Nonaka | 701/208 |
| 2011/0113097 | A1 * | 5/2011 | Takeuchi | 709/204 |
| 2013/0314511 | A1 * | 11/2013 | Chen et al. | 348/50 |

* cited by examiner

*Primary Examiner* — Ngoc-Yen Vu
(74) *Attorney, Agent, or Firm* — Drinker Biddle & Reath LLP

(57) ABSTRACT

Digital photographing apparatus and methods of providing picture at the digital photographing apparatus are disclosed. An example digital photographing apparatus transmits a picture of an object to be captured to a server, acquires at least one pre-captured picture of the object and a captured position of the at least one pre-captured picture from the server, and presents the at least one pre-captured picture and the captured position. The digital photographing apparatus selectively provides the at least one pre-captured picture in consideration of whether the captured position of the object is the same capture position or a different capture position.

15 Claims, 13 Drawing Sheets

FIG. 2
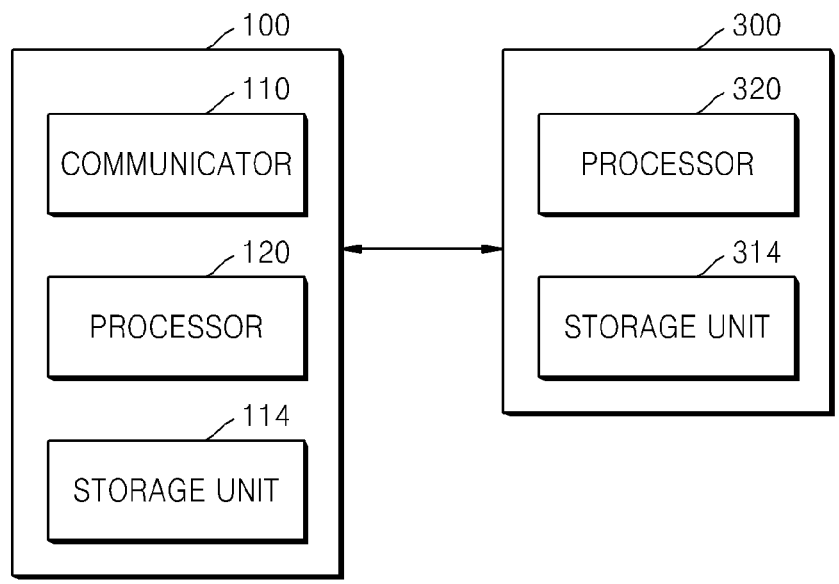
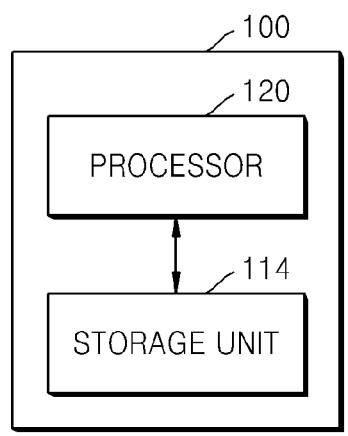

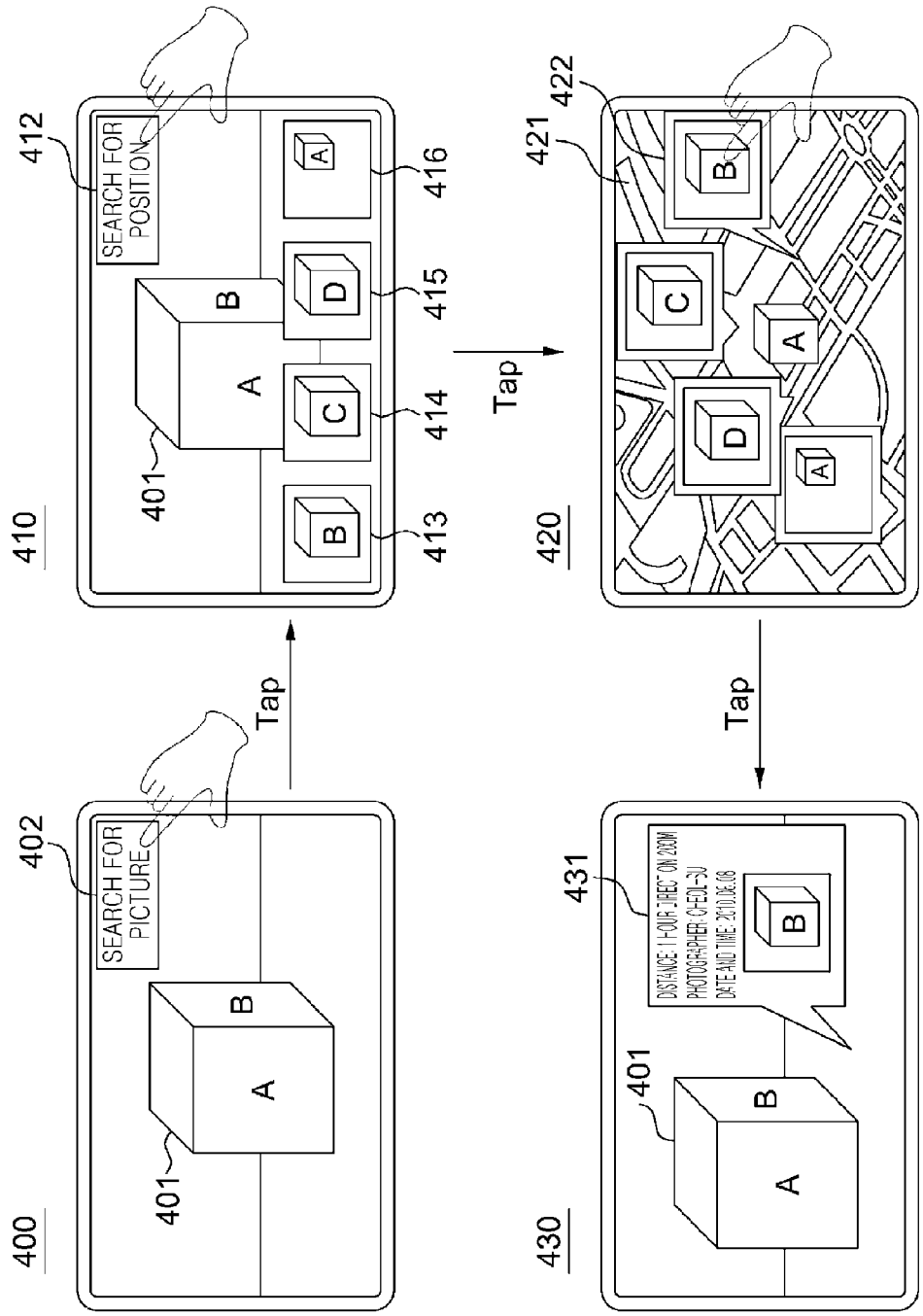

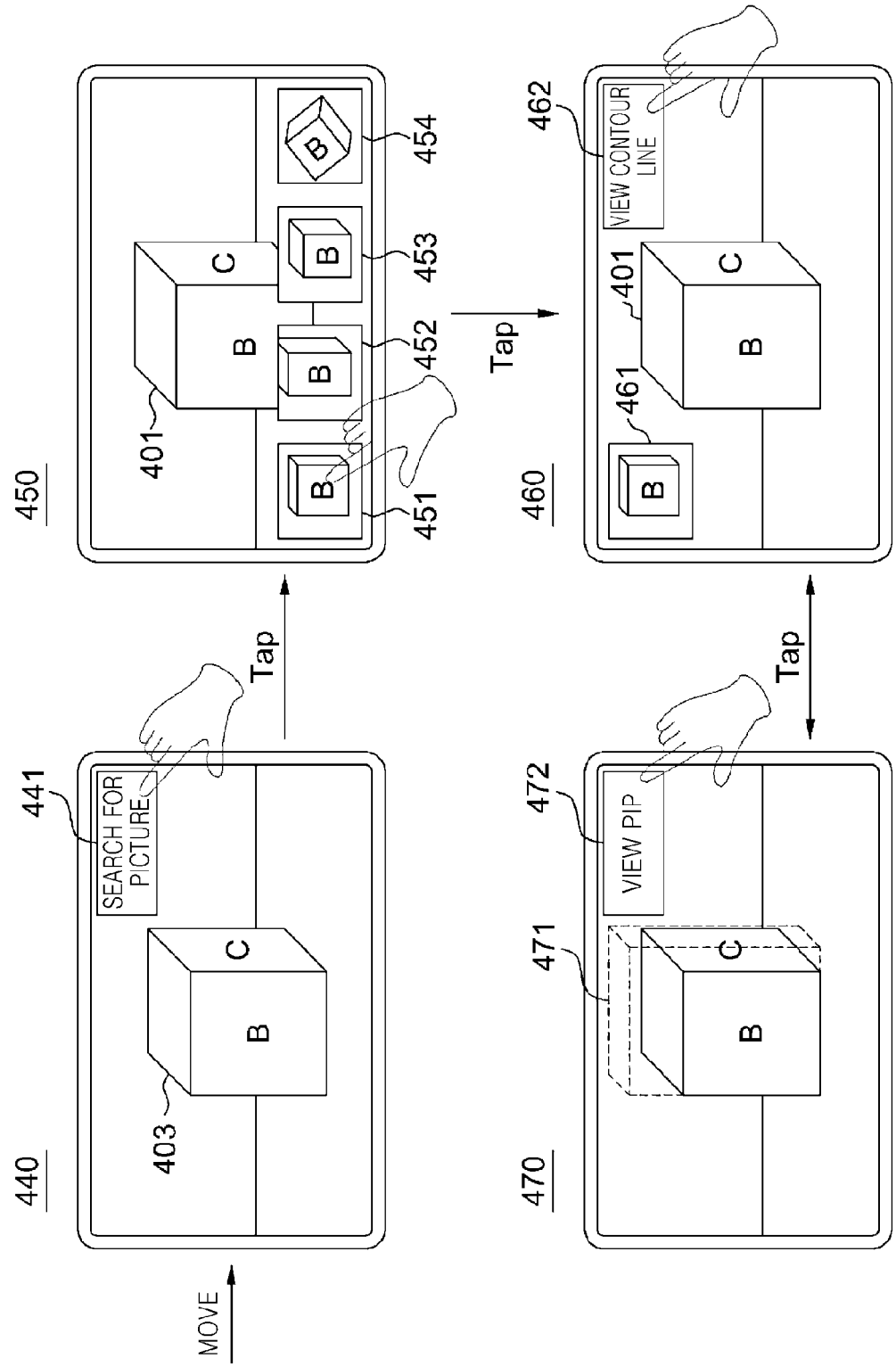

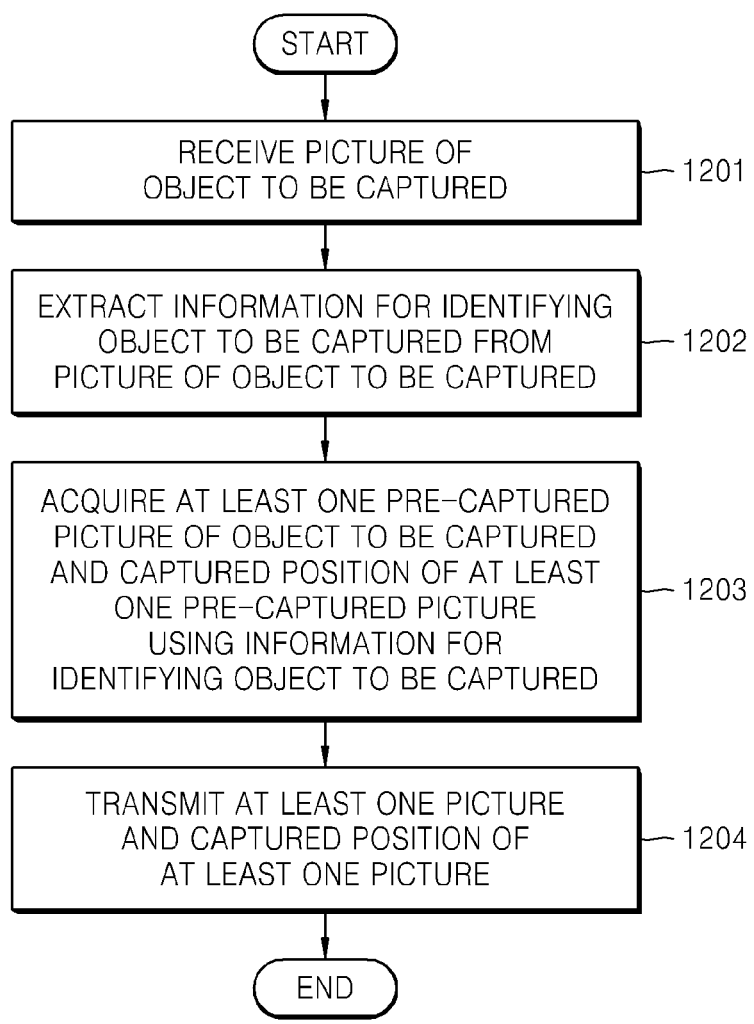

METHOD AND APPARATUS FOR ACQUIRING PRE-CAPTURED PICTURE OF AN OBJECT TO BE CAPTURED AND A CAPTURED POSITION OF THE SAME

CROSS-REFERENCE TO RELATED PATENT APPLICATION

This application claims the priority benefit of Korean Patent Application No. 10-2010-0117289, filed on Nov. 24, 2010, in the Korean Intellectual Property Office, the entirety of which is hereby incorporated by reference.

BACKGROUND

1. Field of the Invention

The present invention relates to digital photographing apparatus and a method of providing a picture which is acquired using the digital photographing apparatus.

2. Description of the Related Art

When a picture is captured using a digital photographing apparatus, the picture includes additional information such as a capturing time, a captured position, values of camera settings when capturing the picture, etc. Also, captured pictures may be stored in a specific server and then provided to users who have accessed the specific server.

If a user captures an object to be captured using a digital photographing apparatus, the user may have difficulty knowing whether conditions for capturing the object are appropriate for capturing. In this case, the user may use the pictures stored in the specific server.

SUMMARY

Disclosed herein are a digital photographing apparatus which acquires and provides at least one pre-captured picture of an object to be captured and at least one captured position of the at least one pre-captured picture, a method of providing a picture taken using the digital photographing apparatus, and a computer-readable recording medium having embodied thereon a computer program for executing the method.

According to an embodiment, there is provided a method of providing a picture taken using a digital photographing apparatus, including: generating information for identifying an object to be captured in response to a command to capture the object; transmitting the information; acquiring at least one pre-captured picture of the object and a captured position of the at least one pre-captured picture; and providing the at least one pre-captured picture and the captured position.

The information may include at least one of a name, an identifier, and a picture of the object.

The at least one pre-captured picture may include first and second pictures which are captured in different positions.

The generation of the information may include generating a time when the object is captured. The acquisition of the at least one pre-captured picture may include acquiring at least one pre-captured picture captured during a time period determined from the time.

Priorities may be given to the at least one pre-captured picture. The acquisition of the at least one pre-captured picture may include acquiring at least one picture within a determined priority range.

The acquisition of the at least one pre-captured picture may include acquiring at least one picture based on a capturer of the at least one pre-captured picture.

The providing of the at least one pre-captured picture and the captured position of the at least one pre-captured picture may include: generating a map comprising the object; and displaying the at least one pre-captured picture and the captured position on the map.

The providing of the at least one pre-captured picture and the captured position may include updating the captured position of the at least one pre-captured picture in real time according to changes in a position of the digital photographing apparatus.

The information may be transmitted to a server through a wired or wireless network using a communication interface of the digital photographing apparatus.

The at least one pre-captured picture of the object and the captured position of the at least one pre-captured picture may be acquired from the server through a wired or wireless network using a communication interface of the digital photographing apparatus.

According to another embodiment, there is provided a method of providing a picture taken using a digital photographing apparatus, including: generating information for identifying an object to be captured in response to a command to capture the object; transmitting the information and a first time when the object is captured; acquiring at least one picture which is captured at a second time included in a time period determined from the first time, from the at least one pre-captured picture of the object; and providing the at least one picture captured at the second time.

According to yet another embodiment, there is provided a method of providing a picture taken with a digital photographing apparatus, including: acquiring a plurality of pre-captured pictures of an object to be captured; determining one of first and second modes; and displaying the plurality of pre-captured pictures according to the determined mode, wherein the plurality of pre-captured pictures displayed in the first mode have different positions, and the plurality of pre-captured pictures displayed in the second mode have the same positions.

According to still another embodiment, there is provided a method of providing a picture of a digital photographing apparatus, including: receiving a picture of an object to be captured; extracting information for identifying the object from the picture of the object; acquiring at least one pre-captured picture of the object and a captured position of the at least one pre-captured picture using the information; and transmitting the at least one pre-captured picture and the captured position.

According to a further embodiment, there is provided a digital photographing apparatus for providing a picture, including: a display unit which displays at least one picture of an object to be captured; a processor; and a memory, wherein the processor generates information for identifying the object to acquire at least one pre-captured picture of the object and a captured position of the at least one pre-captured picture, provides the at least one pre-captured picture and the captured position to the display unit, generates a picture of the object in response to a command to capture the object, and stores the generated picture in the memory.

The information may include at least one of a name, an identifier, and a picture of the object.

The processor may generate a time when the object is captured, to acquire at least one pre-captured picture captured during a time period determined from the time.

Priorities may be given to the at least one pre-captured picture, and the processor may acquire at least one picture within a determined priority range, among the at least one pre-captured picture.

The processor may acquire at least one picture of the at least one pre-captured picture based on capturers of the at least one pre-captured picture.

According to a still further embodiment, there is provided a digital photographing apparatus for providing a picture, including: a display unit which displays at least one picture of an object to be captured; a processor; and a memory, wherein the processor generates information for identifying the object to acquire at least one picture, which is captured at a second time during a time period determined from a first time, among at least one pre-captured picture of the object, transmits the information and the first time when the object is captured, provides the at least one picture captured at the second time to the display unit, generates a picture of the object in response to a command to capture the object, and stores the generated picture in the memory.

According to an even further embodiment, there is provided a digital photographing apparatus for providing a picture, including: a display unit which displays at least one picture of an object to be captured; a processor; and a memory, wherein the processor determines one of a first and second modes to acquire at least one pre-captured picture of the object and a captured position of the at least one pre-captured picture and provides captured positions of a plurality of pre-captured pictures according to the determined mode, wherein the plurality of pre-captured pictures provided to the display unit in the first mode have different positions, and the plurality of pre-captured pictures provided to the display unit in the second mode have the same positions.

According to yet a different embodiment, there is provided a non-transitory computer-readable recording medium having embodied thereon a computer program for executing the disclosed methods.

BRIEF DESCRIPTION OF THE DRAWINGS

The above and other features and advantages of the present invention will become more apparent by describing in detail exemplary embodiments thereof with reference to the attached drawings in which:

FIG. 2 is a block diagram illustrating a process performed by a digital photographing apparatus to acquire a pre-captured picture, according to an embodiment;

FIGS. 4A and 4B are views illustrating a process performed by a digital photographing apparatus to provide a picture, according to an embodiment;

FIG. 8 is a flowchart illustrating a method performed by a digital photographing apparatus to acquire a pre-captured picture, according to an embodiment of;

FIG. 12 is a flowchart illustrating a method performed by a server to provide a pre-captured picture, according to an embodiment.

DETAILED DESCRIPTION

Figure 1:
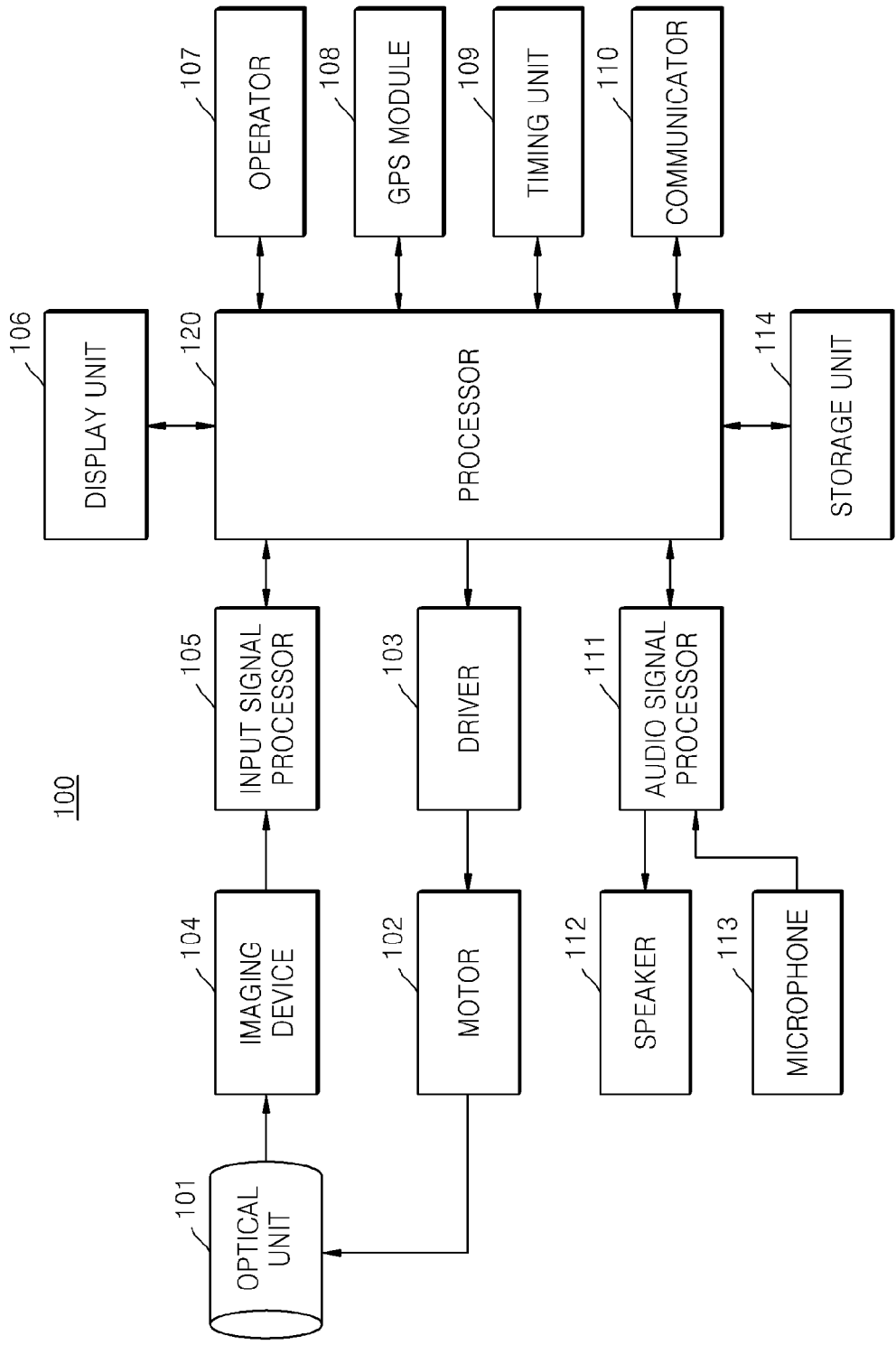
FIG. 1 is a block diagram of a digital photographing apparatus, according to an embodiment.

The present invention will now be described more fully with reference to the accompanying drawings, in which exemplary embodiments of the invention are shown. The invention may, however, be embodied in many different forms and should not be construed as being limited to the embodiments set forth herein. Like reference numerals in the drawings denote like elements, and thus their description will not be repeated.

A digital photographing apparatus according to exemplary embodiments transmits a picture of an object, which is captured, to a server. The server extracts the object from the picture received from the digital photographing apparatus and searches a storage unit for a pre-captured picture of the object. The server transmits the found pre-captured picture and a captured position of the pre-captured picture to the digital photographing apparatus.

The digital photographing apparatus provides the pre-captured picture and the captured position of the pre-captured picture received from the server through a display unit of the digital photographing apparatus. For example, the digital photographing apparatus displays a map including the object on the display unit and displays the pre-captured picture and the captured position on the map. If a user selects one of the pre-captured pictures displayed on the map, the digital photographing apparatus displays an augmented reality image of the pre-captured picture on the display unit or guides a position of the pre-captured picture with a voice through a speaker.

A digital camera will be described as an example of a digital photographing apparatus according to an embodiment. However, the digital photographing apparatus is not limited to the digital camera but may be applied to an apparatus capable of performing the same or similar function to that of the digital photographing apparatus, e.g., a camera phone, a personal digital assistant (PDA), a portable multimedia player (PMP), a camcorder, a smart phone, a laptop computer, a desktop computer, a digital television (TV), a digital frame, etc.

FIG. 1 is a block diagram of a digital camera 100 according to an embodiment.

Referring to FIG. 1, the digital camera 100 includes an optical unit 101, a motor 102, a driver 103, an imaging device 104, an input signal processor 105, a display unit 106, an operator 107, a global positioning system (GPS) module 108, a timing unit 109, a communicator 110, an audio signal processor 111, a speaker 112, a microphone 113, a storage unit 114, and a processor 120.

Structures of elements of the digital camera 100 will now be described in more detail.

The optical unit 101 receives an optical signal from a subject. The optical unit 101 may include a lens which condenses the optical signal, an aperture which adjusts an amount of the optical signal, a shutter which controls an input of the optical signal, etc. The lens may include a zoom lens which controls a viewing angle to narrow or widen according to a focal length and a focus lens which adjusts a focus of the subject. These lenses may be integrated into one lens or may constitute a plurality of lens groups. The shutter may be a mechanical shutter of which a cover moves up and down. Alternatively, instead of the shutter, the imaging device 104 may control a provision of an electric signal to operate as the shutter.

The motor 102 drives the optical unit 101. For example, the motor 102 drives a position of the lens, opening and/or closing of the aperture, an operation of the shutter, etc. so that the digital camera 100 performs operations such as autofocus (AF), auto exposure control (AEC), aperture control, zooming, focusing, etc.

The driver 103 controls the motor 102. For example, the driver 103 controls an operation of the motor 102 according to a control signal input from the processor 120.

The imaging device 104 converts the optical signal input through the optical unit 101 into an electric signal. The imaging device 104 may be a charge-coupled device (CCD), a sensor array, a complementary metal-oxide semiconductor (CMOS) sensor array, or the like.

The input signal processor 105 converts the electric signal provided from the imaging device 104 into a digital signal. The input signal processor 105 performs signal processing, such as gain control, noise reduction processing, waveform shaping, etc., with respect to the electric signal provided from the imaging device 104.

The display unit 106 displays a picture, which is provided through the input signal processor 105, in real time or displays a picture stored in the storage unit 114. The display unit 106 may display information input by a user or information to be provided to the user in various forms such as icons, menus, text, etc. The display unit 106 may be a liquid crystal display (LCD) but is not limited thereto. The display unit 106 may be an organic light-emitting diode (OLED) display apparatus, an electrophoretic display apparatus, or the like.

The operator 107 may include a member which is used by the user to operate the digital camera 100 or to perform various settings when capturing images. The operator 107 may be buttons, keys, a touch panel, a touch screen, a dial, or the like and may receive a control signal from the user such as power on/off, capturing start/stop, play start/stop/search, driving of an optical system, a mode change, a menu operation, a selection operation, or the like.

The GPS module 108 receives and processes at least one satellite signal to calculate a position of the digital camera 100.

The timing unit 109 provides a request time in response to a request of the processor 120. The request time may be set when manufacturing the digital camera 100, may be set by the user, or may be set with reference to a satellite time acquired by the GPS module 108.

The communicator 110 is an interface through which data is transmitted to or received from an external device (not shown) through a wired or wireless network. The communicator 110 may communicate with the external device using a communication standard such as wireless local area network (WLAN), Bluetooth, Zigbee, WiBro, Wi-Fi, universal serial bus (USB), and the like.

The storage unit 114 stores data necessary for an operation of the digital camera 100 and various forms of data necessary by the user. For example, the storage unit 114 may temporarily store data input from the input signal processor 105, data for operation processing, an algorithm necessary for an operation of a digital camera, set data, processed results, etc. The storage unit 114 stores a picture file, which is input from the input signal processor 105, compressed, and generated, and various formats of files. The storage unit 114 may be an internal memory installed in the digital camera 100 or an external memory communicatively coupled to the digital camera 100. Examples of the storage unit 114 may include a static random access memory (SRAM), a dynamic random access memory (DRAM), a read only memory (ROM), a flash memory, a hard disk, a secure digital (SD) memory card, a multimedia card (MMC), an optical disk, a magneto-optical disk, a hologram memory, etc.

The audio signal processor 111 converts a digital signal of a sound source provided from the processor 120 into a sound, amplifies the sound, and transmits the sound to the speaker 112. The audio signal processor 111 receives a sound through the microphone 113, converts the sound into a digital signal and compresses the digital signal to generate an audio file.

The processor 120 processes a picture through a digital operation. For example, the processor 120 reduces noise of the picture and performs image signal processing with respect to the picture to improve picture quality, for example, gamma correction, color filter interpolation, color matrix, color correction, color enhancement, or the like. The processor 120 compresses the picture, which is generated by performing image signal processing, to generate a picture file and restores a picture from the picture file. A compression format of the picture may be a reversible format or an irreversible format. A Joint Photographic Experts Group (JPEG) format, a JPEG 2000 format, or the like may be used as an appropriate compression format. The processor 120 may functionally perform unclearness processing, color processing, blur processing, edge emphasis processing, image analysis processing, image recognition processing, image effect processing, etc. The processor 120 may perform image signal processing which is to be displayed on the display unit 106. For example, the processor 120 may perform luminance level control, color correction, contrast control, contour emphasis control, screen division processing, generation of character images, synthesis processing of character images, etc.

The processor 120 performs image signal processing as described above and controls the elements of the digital camera 100 according to the processing results. The processor 120 controls the elements according to the control signal input through the operator 107 by the user.

The processor 120 transmits information necessary for identifying the object to be captured to the server or the storage unit 114 and acquires at least one pre-captured picture of the object and a captured position of the at least one pre-captured picture.

FIG. 2 is a block diagram illustrating a process 200 performed by the digital camera 100 to acquire a pre-captured picture, according to an embodiment.

The process 200 is performed by the digital camera 100 to acquire a pre-captured picture and a captured position thereof from a server 300. The communicator 110 of the digital camera 100 is connected to the server 300 through a wired or wireless network to transmit and/or receive data to and/or from the server 300. For example, the digital camera 100 accesses the server 300 to upload or download pictures captured by a plurality of users or information related to the pictures. As indicated by reference numeral 250 of FIG. 2, the digital camera 100 may acquire a pre-captured picture and a captured position thereof from the storage unit 114 of the digital camera 100.

Figure 3:
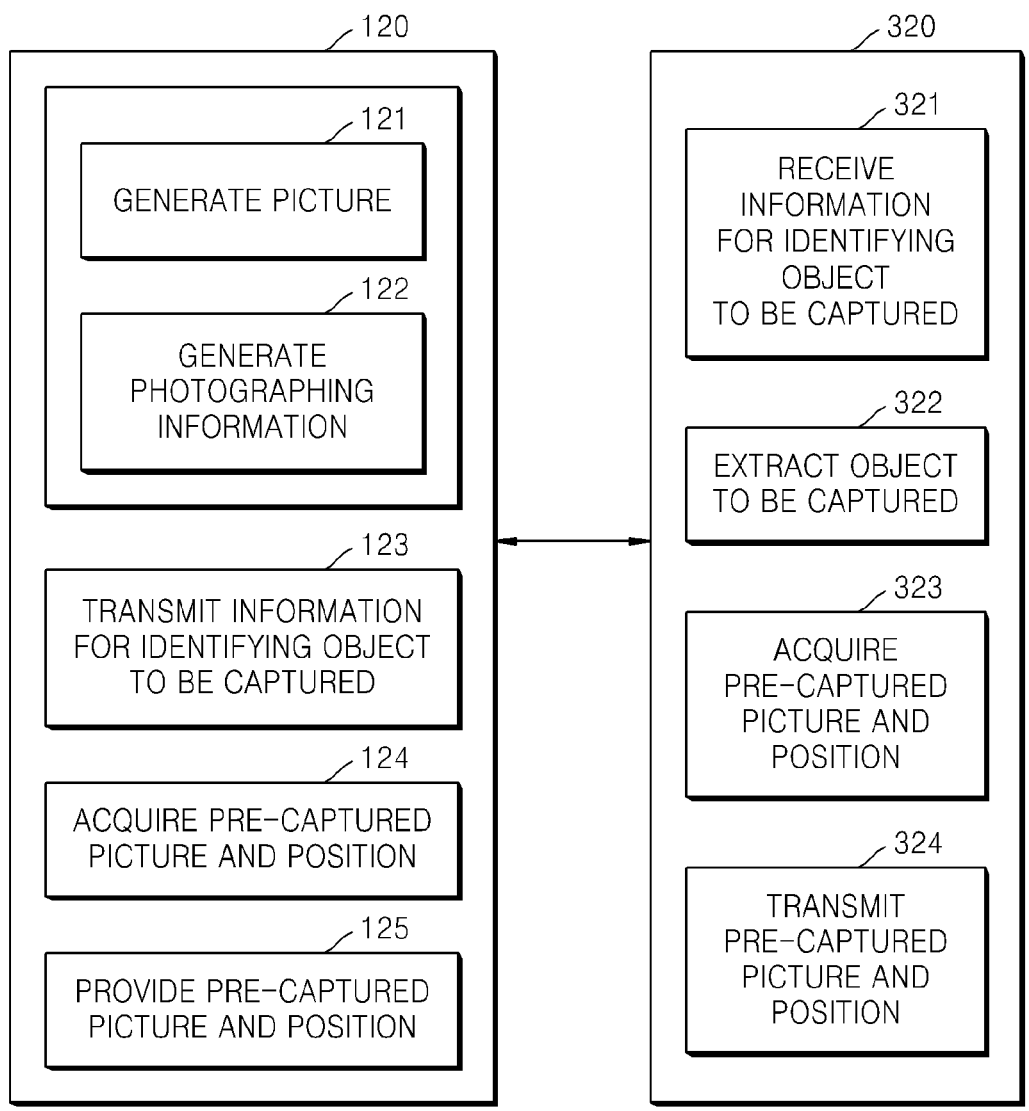
FIG. 3 is a view illustrating a function of a processor of a digital photographing apparatus and a function of a processor of a server, according to an embodiment.

FIG. 3 is a view illustrating a function of the processor 120 of the digital camera 100 and a function of a processor 320 of the server 300, according to an embodiment. Referring to FIG. 3, the processor 120 of the digital camera 100 communicates with the processor 320 of the server 300 to transmit identification information of an object to be captured and acquire at least one pre-captured picture and a captured position thereof.

If a user commands to capture an object to be captured, the processor 120 of the digital camera 100 generates a picture of the object in response to the command (121). For example, the processor 121 performs image signal processing with respect to data received through the input signal processor 105 when the user commands, to generate the picture. Here, the generated picture may include the whole or a part of the object.

The processor 120 generates capturing information related to the picture of the object (122). For example, the capturing information may include information regarding a capturing time, a capturing position, a camera manufacturer, a camera model, a camera rotation direction, a capturing date, a focal length, a shutter speed, etc. For example, the processor 120 acquires a time when the object is captured from the timing unit 109 or acquires a captured position of the object from the GPS 108.

The processor 120 transmits identification information necessary for identifying the object to the server 300 through the communicator 110 (123). The identification information may include the picture of the object, a name of the object, and an identifier of the object. Here, the name and the identifier of the object may be directly input by the user in character forms or may be selected from a plurality of lists provided to the user.

The processor 120 transmits the capturing information related to the picture of the object to the server 300 through the communicator 110. For example, the processor 120 transmits information regarding a captured time, a captured position, and a capturer of the object, etc. to the server 300.

The processor 320 of the server 300 receives the identification information necessary for identifying the object from the processor 120 of the digital camera 100 (321). If the picture of the object is used as the identification information, the server 300 extracts the name or identifier of the object from the picture of the object (322).

For example, the processor 320 of the server 300 extracts the object from the picture through image recognition processing. Here, the image recognition processing may be performed using various well-known image recognition algorithms. The processor 320 acquires the name or identifier of the object based on the extracted object. A storage unit 314 of the server 300 stores various types of images and names or identifies corresponding to the images. The processor 320 searches the storage unit 314 for the most similar image to the extracted object and determines the found image as a name or identifier of the object. According to another embodiment of the present invention, the server 300 may directly receive the name or identifier of the object from the digital camera 100. In this case, the processor 320 may omit image recognition processing for acquiring the name of the object and the object.

The processor 320 of the server 300 acquires at least one pre-captured picture of the object and the captured position of the picture from the storage unit 314 of the server 300, using the name or identifier of the object (323). The processor 320 compares the name or identifier of the object with a name or identifier included in additional information of the pre-captured picture stored in the storage unit 314.

The storage unit 314 stores the at least one pre-captured picture of the object and the additional information of the picture including a captured position, captured information of the picture, a name or identifier of the object included in the picture, etc. For example, an Exchangeable Image File (Exif) format may be used to store additional information of a picture file. The Exif format refers to a formation of a picture file used in a digital camera and may include various types of additional information related to a picture. The captured position of the pre-captured picture, the captured information of the picture, and the name or identifier of the object included in the picture may be stored in a separate area from that in which the picture file is stored. In this case, the above information may be connected to the picture file through a link.

If the same or similar name or identifier of the pre-captured picture to the name or identifier of the object is stored in the storage unit 314, the processor 320 of the server 300 transmits the pre-captured picture to the digital camera 100 (324).

The processor 320 also transmits the captured position of the pre-captured picture to the digital camera 100 (324). Here, the captured position of the pre-captured picture may be included in the additional information of the picture.

The processor 120 of the digital camera 100 acquires the at least one pre-captured picture and the captured position of the picture which are transmitted from the server 300 (124).

According to another embodiment, if a plurality of pre-captured pictures exist, the plurality of pre-captured pictures may be captured in different positions. Distances among the different positions for distinguishing the different positions from one another may be determined using various methods. For example, the GPS module 108 may determine the distances in consideration of distances for distinguishing different coordinate values from one another. Alternatively, the distances may be set by a user or may be determined based on a distance between an object to be captured and a digital photographing apparatus. In more detail, as the distance between the object and the digital photographing apparatus is shortened, the distances may gradually decrease. As the distance between the object and the digital photographing apparatus increases, the distances may gradually increase.

According to another embodiment, the processor 120 may transmit the captured position of the object to the server 300 and acquire a picture which is captured in a different position from the captured position of the object. In this case, the server 300 may compare the captured position of the object with a captured position included in the additional information of the pre-captured picture to select and provide a pre-captured picture in a different position.

According to another embodiment, the processor 120 may transmit a captured time of the object to the server 300. In this case, the processor 120 may acquire a pre-captured picture from the server 300, the pre-captured picture captured within a time period which is determined from the captured time of the object. For example, when a user captures an object to be captured, the user may desire to refer to a picture of another user who captures an object to be captured in a similar time zone. If the picture of the other user is registered in the server 300 simultaneously with the time the user captures an object, the processor 120 transmits a captured time of the object to the server 300 and acquires the picture of the other user before a determined time from the captured time of the object.

According to another embodiment, the processor 120 may acquire at least one of the at least one pre-captured picture based on who captured the at least one pre-captured picture. For example, the server 300 may include information regarding the capturers of the pre-captured pictures as the additional information of the picture. If the processor 120 requests a pre-captured picture of an object to be captured, the server 300 may transmit information regarding at least one capturer included in additional information to the processor 120. The processor 120 may provide the information regarding the at least one capturer through the display unit 106, receive an input of a user who selects one of the pieces of information, and transmit the information regarding the capturer selected by the user to the server 300. The server 300 may acquire at least one picture captured by the capturer from the storage unit 314 based on the information regarding the capturer and transmit the picture to the processor 120.

According to another embodiment, if priorities are given to at least one pre-captured picture, the processor 120 may acquire at least one picture within a range of determined priorities of the at least one pre-captured picture. For example, the server 300 may include additional information of at least one pre-captured picture including priorities. The priorities may be determined by the server 300 or may be determined according to a preference of a user who uses the server 300. If the processor 120 requests a pre-captured picture of an object to be captured, the server 300 may acquire a picture included in a determined priority of the priorities from the storage unit 314 and transmit the acquired picture to the processor 120.

The processor 120 of the digital camera 100 provides the at least one picture and the captured position of the at least one picture using various output methods (125). For example, the processor 120 provides the at least one picture and the captured position through the display unit 106 simultaneously or according to a determined order. According to an embodiment, the processor 120 may provide the at least one picture on a side of the display unit 106. If the user selects one of these pictures, the processor 120 may provide position information regarding the selected picture through the display unit 106. According to another embodiment, the processor 120 may generate a map including an object to be captured on the display unit 106 and display at least one picture and a captured position of the at least one picture on the map. The map may be included in the storage unit 114 or may be acquired from an external device. According to another embodiment, the processor 120 may provide the captured position of the at least one picture through the speaker 112. In this case, the processor 120 may provide guide information for reaching the captured position with audio.

The above-described process performed by the server 300 to acquire a pre-captured picture may be performed by the digital camera 100.

For example, the process 322 of the server 300 of extracting the name or identifier of the object to be captured based on the identification information of the object may be performed by the processor 120 of the digital camera 100. The process 323 performed by the server 300 to acquire the at least one pre-captured picture of the object and the captured position from the storage unit 314 of the server 300 may be replaced with a process performed by the processor 120 of the digital camera 100 to acquire at least one pre-captured picture of an object to be captured and a captured position of the at least one pre-captured picture from the storage unit 114 of the digital camera 100.

FIGS. 4A and 4B are views illustrating a process performed by the digital camera 100 to provide a picture, according to an embodiment.

Reference numerals 400, 410, 420 and 430 of FIG. 4A each denote a process of acquiring a picture of an object, which is captured in a different position by a user, and position information of the picture.

In the process 400 of FIG. 4A, the digital camera 100 generates a picture of an object to be captured in response to a command to capture the object and provides the picture to the display unit 106. An object 401 to be captured is provided on the display unit 106, and a menu 402 is provided to acquire at least one picture obtained by capturing the object in a different position. Here, the menu 402 may not be provided through the display 106 but may be included as a member of the operator 107.

In the process 410 of FIG. 4A, the digital camera 100 provides at least one picture of the object which is captured in the different position, in response to a selection of the menu 402 by the user. One or more pictures 413 through 416 may be provided as thumbnails on a side of the display unit 106. Here, the user selects a menu 412 to request positions of the one or more pictures 413 through 416, which are provided to the display unit 106 of the digital camera 100. Alternatively, the user may select one of the one or more pictures 413 through 416 and request a position corresponding to the selected picture of the digital camera 100.

In the process 420 of FIG. 4A, the digital camera 100 provides a position of at least one picture to the display unit 106, in response to a selection of the menu 412 by the user. For example, the position of the at least one picture may be displayed as a thumbnail on a map 421. The user selects one picture 422 of one or more pictures provided on the map 421 and requests detailed information regarding the selected picture 422 of the digital camera 100.

In the process 430 of FIG. 4A, the digital camera 100 provides detailed information 431 of at least one picture to the display unit 106 in response to the request of the user for detailed information of the at least one picture. The detailed information 431 of the picture may include detailed information regarding a position in which the picture has been captured, a photographer of the picture, a time when the picture has been captured, etc. The picture may be provided using an augmented reality technique. The augmented reality technique refers to a technique for synthesizing a virtual object or information within a real environment so that the object looks like the object exists in the real environment. The digital camera 100 updates the position of the picture in real time according to changes in a position of the user, using the augmented reality technique.

Reference numerals 440, 450, 460 and 470 of FIG. 4B each denote a process of acquiring a picture, which is obtained by capturing an object to be captured in the same position as that in which the user has captured the object, and position information of the picture.

The user moves to the position in which the picture of the object has been captured, using position information of at least one pre-captured provided from the digital camera 100. The digital camera 100 provides the user with at least one pre-captured picture of the object in the same position.

In the process 440 of FIG. 4B, the digital camera 100 generates a picture of the object to be captured and provides the picture to the display unit 106, in response to a new command to capture the object. The display unit 106 provides a menu 441 for acquiring an object 403 to be captured and a picture of the object which is captured in the same position. The digital camera 100 may use the picture selected by the user in the process 410 of FIG. 4A, instead of the generated picture in response to the new command.

In the process 450 of FIG. 4B, the digital camera 100 provides at least one picture of the object, which is captured in the same position, in response to a selection of the menu 441 by the user. One or more pictures 451 through 454 may be provided as thumbnails on a side of the display unit 106. The pictures are acquired by capturing the object in the same position but have different angles, altitudes, times, etc. Therefore, the user selects the picture 451 which is referred to, to capture the object.

In processes 460 and 470 of FIG. 4B, the picture 451 selected by the user is provided. The picture 451 selected by the user may be provided in a picture-in-picture (PIP), contour line, or transparent form. The PIP, contour line, and transparent forms may be provided through the display unit 106 in response to a command of the user to select a menu for displaying the PIP, contour line, and transparent forms. In the process 460 of FIG. 4B, the picture 451 selected by the user is provided in a PIP form 461. The user captures the object in conditions appropriate for capturing the object, with reference to the picture of the PIP form 461. The user selects a menu 462 for providing a contour line form. In the process 470 of FIG. 4B, the picture 451 selected by the user is provided in a contour line form 471 through the display unit 106 in response to the selection of the menu 462 by the user. The user captures the object with reference to the picture of the contour line form 471 and selects a PIP view menu 472 to be provided with the picture 451 in the PIP form 461.

Figure 5:
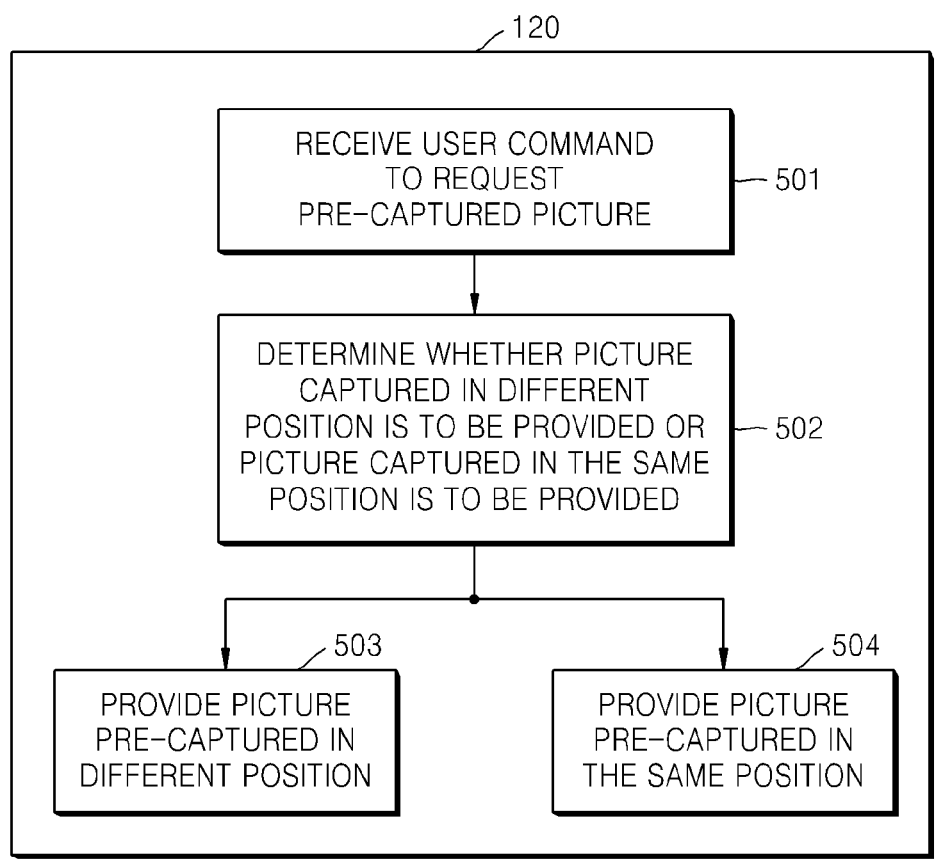
FIG. 5 is a view illustrating a process performed by a digital photographing apparatus to acquire a pre-captured picture, according to another embodiment.

FIG. 5 is a view illustrating a process performed by the digital camera 100 to acquire a pre-captured picture, according to another embodiment. The processor 120 of the digital camera 100 provides a picture of an object to be captured to the display unit 106 and receives a command of a user to request at least one pre-captured picture of the object (501).

The processor 120 determines whether a picture pre-captured in a different position is to be provided or a picture pre-captured in the same position is to be provided based on the command of the user (502). For example, the processor 120 provides a menu on which one of the two modes is selected using the display unit 106 and determines whether the picture pre-captured in the different position or the picture pre-captured in the same position is to be provided, according to a selection by the user. If a picture of the object pre-captured in the different position has been provided before the command of the user is received (501), the processor 120 determines that the picture pre-captured in the same position is to be provided.

The processor 120 provides the picture pre-captured in the different position (503) or provides the picture pre-captured in the same position (504) according to the result of the determination (502). If a pre-captured picture is provided, the processor 120 provides position information of the pre-captured picture. The processor 120 may search the storage unit 114 for a pre-captured picture and provide the pre-captured picture, or may acquire a pre-captured picture from the server 300 and provide the pre-captured picture.

Figure 6:
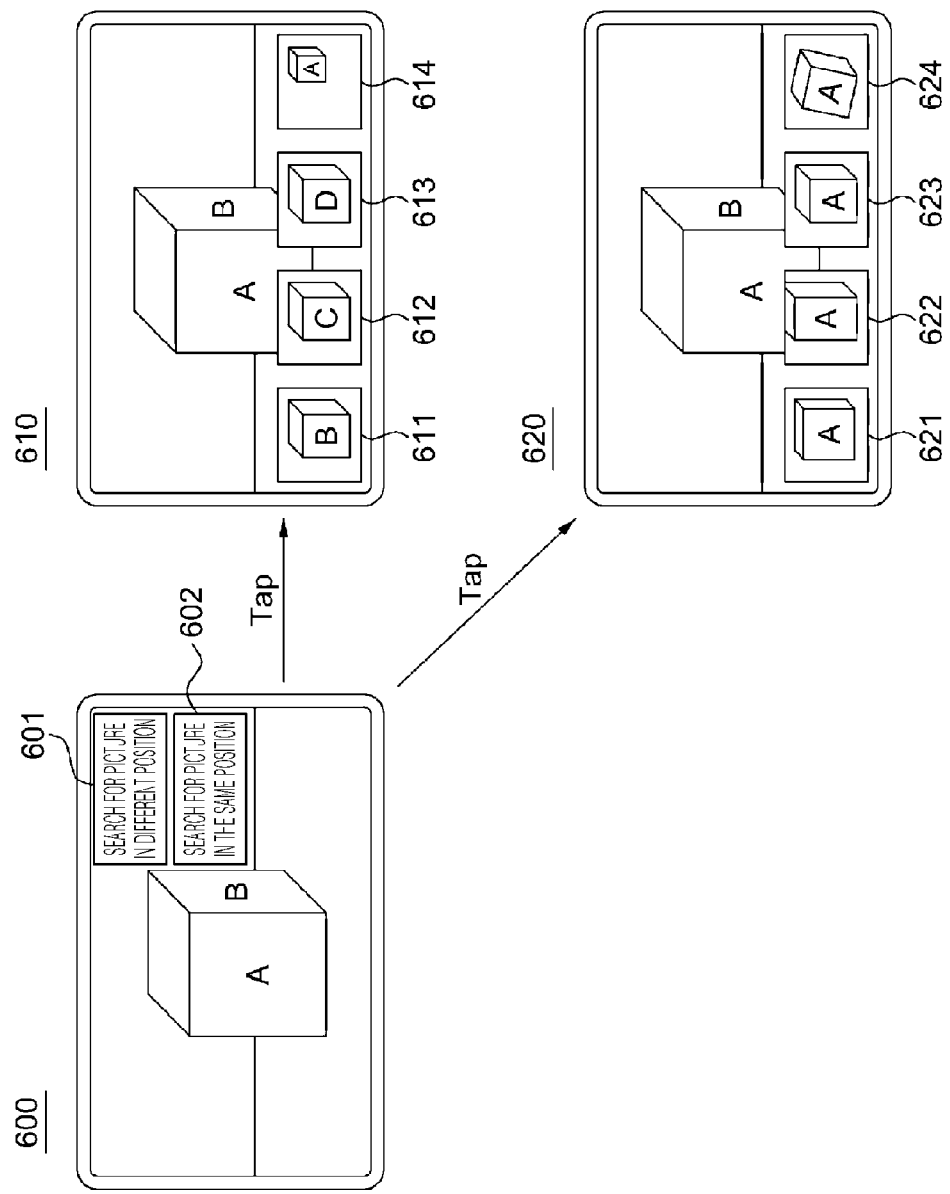
FIG. 6 is a view illustrating a process performed by a digital photographing apparatus to provide a picture, according to another embodiment.

FIG. 6 is a view illustrating processes 600, 610 and 620 performed by the digital camera 100 to provide a picture, according to another embodiment.

The process 600 of FIG. 6 illustrates a menu by which the digital camera 100 acquires a picture pre-captured in a different position or the same position. A menu item 601 of the process 600 of FIG. 5 is to acquire a picture pre-captured in a different position, and a menu item 602 is to acquire a picture pre-captured in the same position. A user selects one of the menu items 601 and 602 to acquire a pre-captured picture.

The process 610 of FIG. 6 illustrates a picture pre-captured in a different position if the user selects the menu item 601. One or more pre-captured pictures 611 through 614 are provided as thumbnails on a side of the display unit 106. The user selects one of the one or more pre-captured pictures 611 through 614 and is provided with a position of the selected picture from the digital camera 100.

The process 620 of FIG. 6 illustrates a picture pre-captured in the same position if the user selects the menu item 602. The one or more pre-captured pictures 621 through 624 are provided as thumbnails on a side of the display unit 106. The user selects one of the one or more pre-captured pictures 621 through 624 and is provided with the selected picture in a PIP, contour line, or a transparent form from the digital camera 100.

The above-described pre-captured pictures and additional information of the pre-captured pictures may be stored in file forms in the storage unit 114 of the digital camera 100 or the storage unit 314 of the server 300. For example, pre-captured pictures and additional information may be stored using an Exif format.

Figure 7:
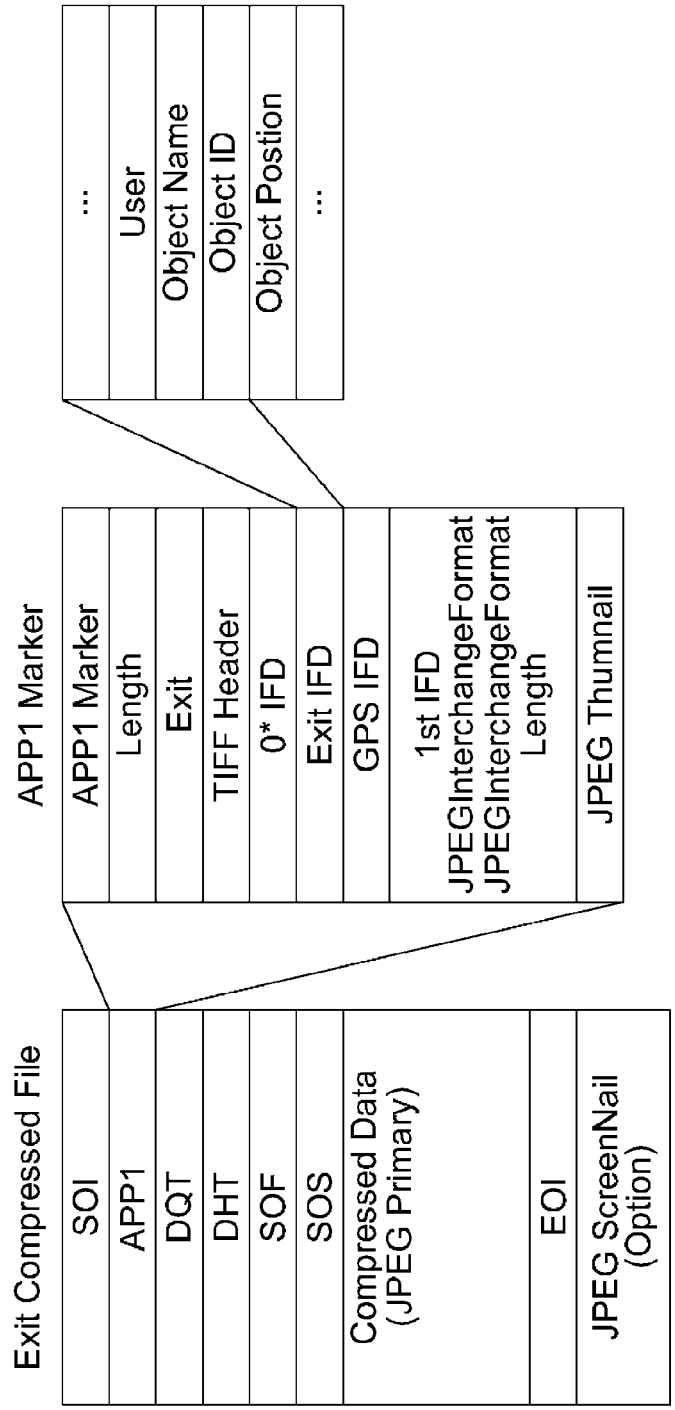
FIG. 7 is a view illustrating a file structure of a pre-captured picture, according to an embodiment.

FIG. 7 is a view illustrating a file structure of a pre-captured picture according to an embodiment.

A file of a pre-captured picture may have a structure which complies with an Exif format, as shown in FIG. 7. A file compressed in an Exif format includes an image start marker SOI, a first application marker segment area APP1 including Exif attribute information, a quantization table area DQT, a Huffman table area DHT, a frame header area SOF, a scan header area SOS, compressed data, an image end marker EOI, and a JPEG screen nail area JPEG ScreenNail.

The first application marker segment area APP1 includes an APP1 marker, a length, an Exif identifier code Exif, a Tiff header, a $0^{th}$ field $o^{th}$ IFD, an Exif field Exif IFD including a maker note, a GPS field GPS IFD related to GPS information, a first field $1^{st}$ IFD storing information related to JPEG thumbnails, and a JPEG thumbnail area JPEG Thumbnail. The JPEG thumbnail area JPEG Thumbnail may include SOI, DQT, DHT, SOF, SOS, compressed data, and EOI areas. According to an embodiment of the present invention, a time of a pre-captured picture may be stored in an Exif field. A position of the pre-captured picture may be stored in a GPS field. A capturer of the pre-captured picture, a name of an object to be captured included in the pre-captured picture, an identifier of the object, a position of the object, etc. may be stored in a maker note of an Exif field. The processor 120 extracts an object to be captured or acquires a pre-captured picture and a position of the pre-captured picture using additional information of the above-described Exif format.

Figure 8:
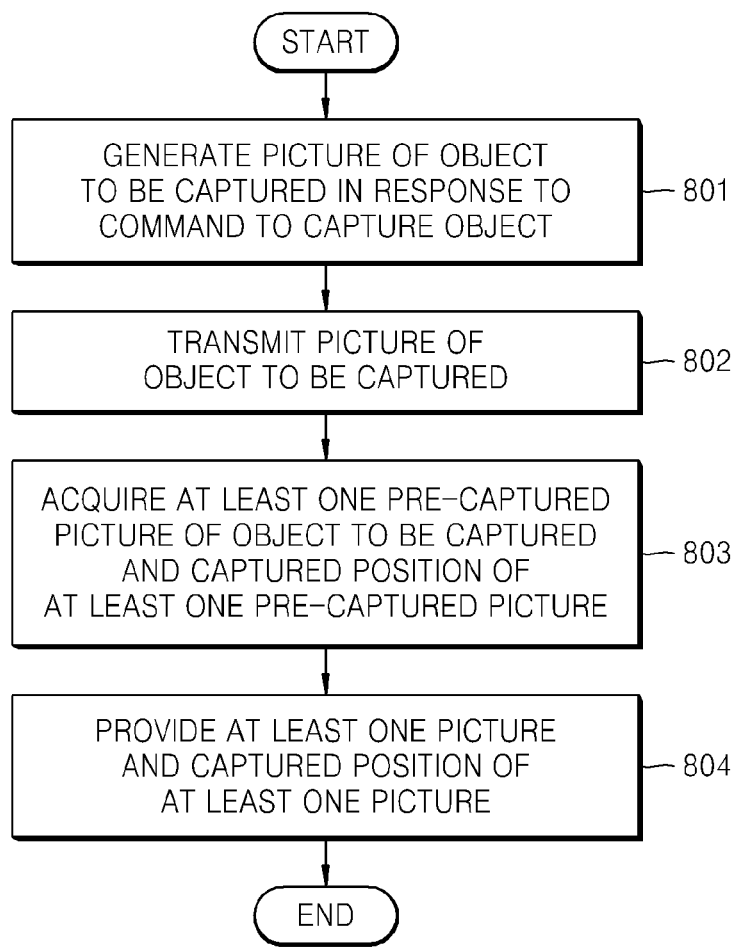

FIG. 8 is a flowchart illustrating a method performed by the digital camera 100 to acquire a pre-captured picture, according to an embodiment. The method may be performed by processing logic (a part or a whole of which is realized by hardware, such as a circuit, a chip, or the like, or software executed in a computer). In the present embodiment, the method is performed by the digital camera 100.

In operation S801, the digital camera 100 generates a picture of an object to be captured in response to a command to capture the object. In operation 802, the digital camera 100 transmits the picture of the object to the storage unit 114 or the server 300. In operation 803, the digital camera 100 acquires at least one pre-captured picture of the object and a captured position of the at least one pre-captured picture from the storage unit 114 or the server 300. If a plurality of pre-captured pictures exist, the plurality of pre-captured pictures may be pictures which are captured in different positions.

In operation 804, the digital camera 100 provides the at least one pre-captured picture and the captured position of the at least one pre-captured picture to a user. In this case, the digital camera 100 may generate a map including the object and display the at least one pre-captured picture and the captured position of the at least one pre-captured picture on the map. The digital camera 100 may provide the at least one pre-captured picture using an augmented reality technique. For example, the digital camera 100 may update the captured position of the at least one pre-captured picture according to changes in a position thereof and provide the captured position on the display unit 106.

Figure 9:
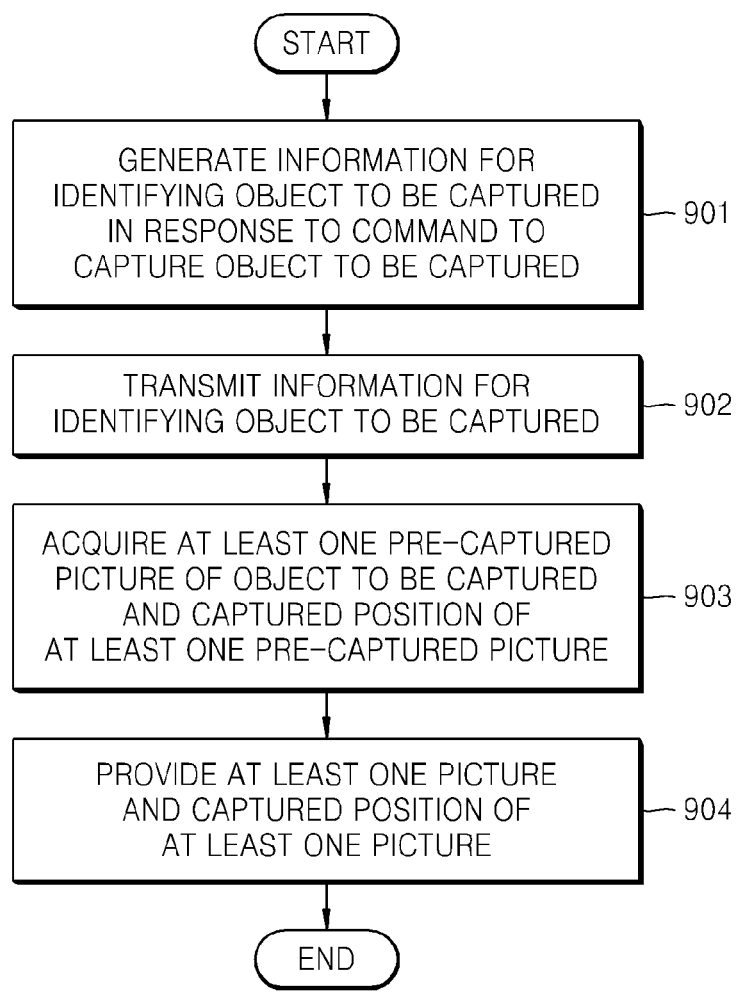
FIG. 9 is a flowchart illustrating a method performed by a digital photographing apparatus to acquire a pre-captured picture, according to another embodiment.

FIG. 9 is a flowchart illustrating a method performed by the digital camera 100 to acquire a pre-captured picture, according to another embodiment. The method may be performed by processing logic (a part or a whole of which is realized by hardware, such as a circuit, a chip, or the like, or software executed in a computer). In the present embodiment, the method is performed by the digital camera 100.

In operation 901, the digital camera 100 generates information for identifying an object to be captured in response to a command to capture the object. Here, the information may be a name of the object, an identifier of the object, or a picture of the object.

In operation 902, the digital camera 100 transmits the information to the storage unit 114. Alternatively, the digital camera 100 may transmit the information to the server 300 through a wired or wireless network using a communication interface of the digital camera 100 (e.g., the communicator 110). In operation 903, the digital camera 100 acquires at least one pre-captured picture of the object and a captured position of the at least one pre-captured picture from the storage unit 114. Alternatively, the digital camera 100 may acquire at least one pre-captured picture of the object and a captured position of the at least one pre-captured picture from the server 300 through a wired or wireless network using a communication interface of the digital camera 100 (e.g., the communicator 110). If a plurality of pre-captured pictures exist, the plurality of pre-captured pictures may be pictures which are captured in different positions.

According to an embodiment, the digital camera 100 may generate a time when an object to be captured is captured and acquire at least one pre-captured picture from at least one pre-captured picture captured during a time period determined from the time. According to another embodiment, if priorities are given to the at least one pre-captured picture, the digital camera 100 may acquire at least one pre-captured picture included within a determined priority range among the at least one pre-captured picture based on the priorities. According to another embodiment, the digital camera 100 may acquire at least one pre-captured picture which is captured by a specific capturer of capturers of the at least one pre-captured picture, among the at least one pre-captured picture.

In operation 904, the digital camera 100 provides the at least one pre-captured picture and the captured position of the at least one pre-captured picture to a user. According to an embodiment, the digital camera 100 may generate a map including the object and display the at least one pre-captured picture and the captured position of the at least-one pre-captured picture on the map. According to another embodiment, the digital camera 100 may provide the object using an augmented reality technique. For example, if a position of the digital camera 100 changes with a movement of the user, the digital camera 100 may update the captured position of the at least one pre-captured picture and provide the updated captured position to the display unit 106. If the number of the at least one pre-captured picture is two or more, the digital camera 100 may provide the two or more pre-captured pictures through the display unit 106, receive a selection by the user for one of the two or more pre-captured pictures, and provide the selected pre-captured picture through the display unit 106. Here, the digital camera 100 may provide a user interface through which the user is able to select at least one of the two or more pre-captured pictures. For example, the digital camera 100 may provide the two or more pre-captured pictures as thumbnails on the user interface. If the user selects one of the thumbnails, the digital camera 100 may provide a position of a pre-captured picture corresponding to the selected thumbnail through the display unit 106.

Figure 10:
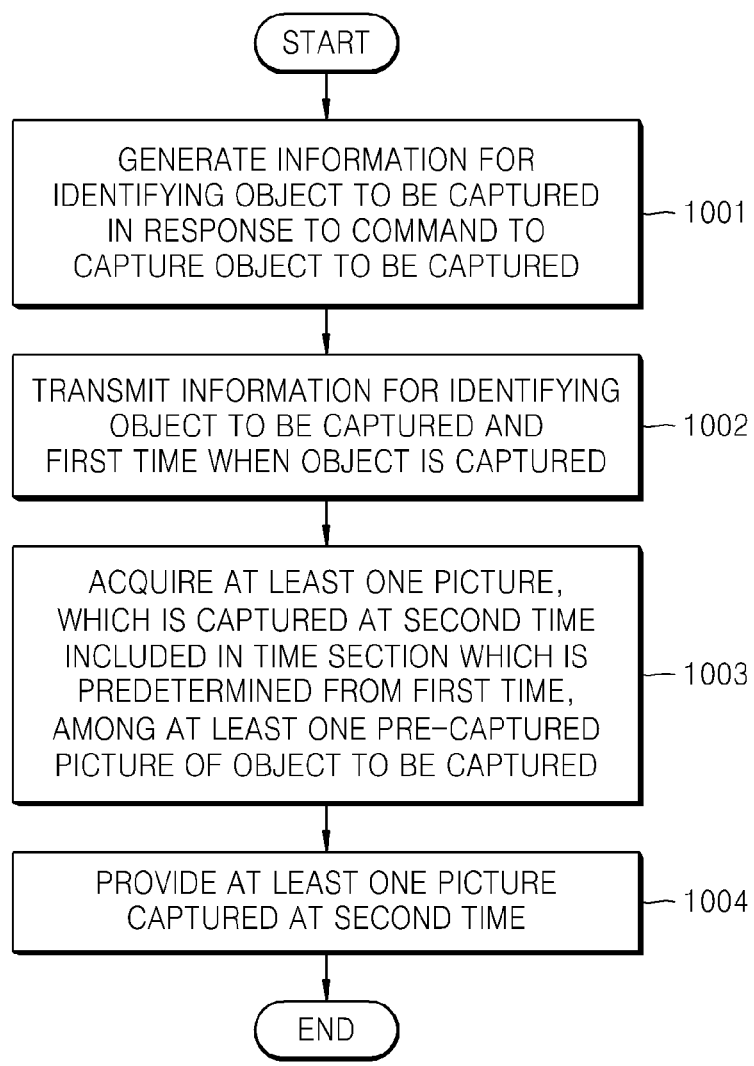
FIG. 10 is a flowchart illustrating a method performed by a digital photographing apparatus to acquire a pre-captured picture, according to another embodiment.

FIG. 10 is a flowchart illustrating a method performed by the digital camera 100 to acquire a pre-captured picture, according to another embodiment. The method may be performed by processing logic (a part or a whole of which is realized by hardware, such as a circuit, a chip, or the like, or software executed in a computer). In the present embodiment, the method is performed by the digital camera 100.

In operation 1001, the digital camera 100 generates information for identifying an object to be captured in response to a command to capture the object. Here, the information may include a name of the object, an identifier of the object, or a picture of the object. In operation 1002, the digital camera 100 transmits information for identifying the object and a captured time of the object to the storage unit 114 or the server 300. In operation 1003, the digital camera 100 acquires at least one pre-captured picture captured during a time period determined from a time when the information is transmitted, among at least one pre-captured picture of the object. Here, the determined time period may be before or after the object is captured. In operation 1004, the digital camera 100 provides the at least one pre-captured picture, which is captured within the determined time period, to a user through the display unit 106.

Figure 11:
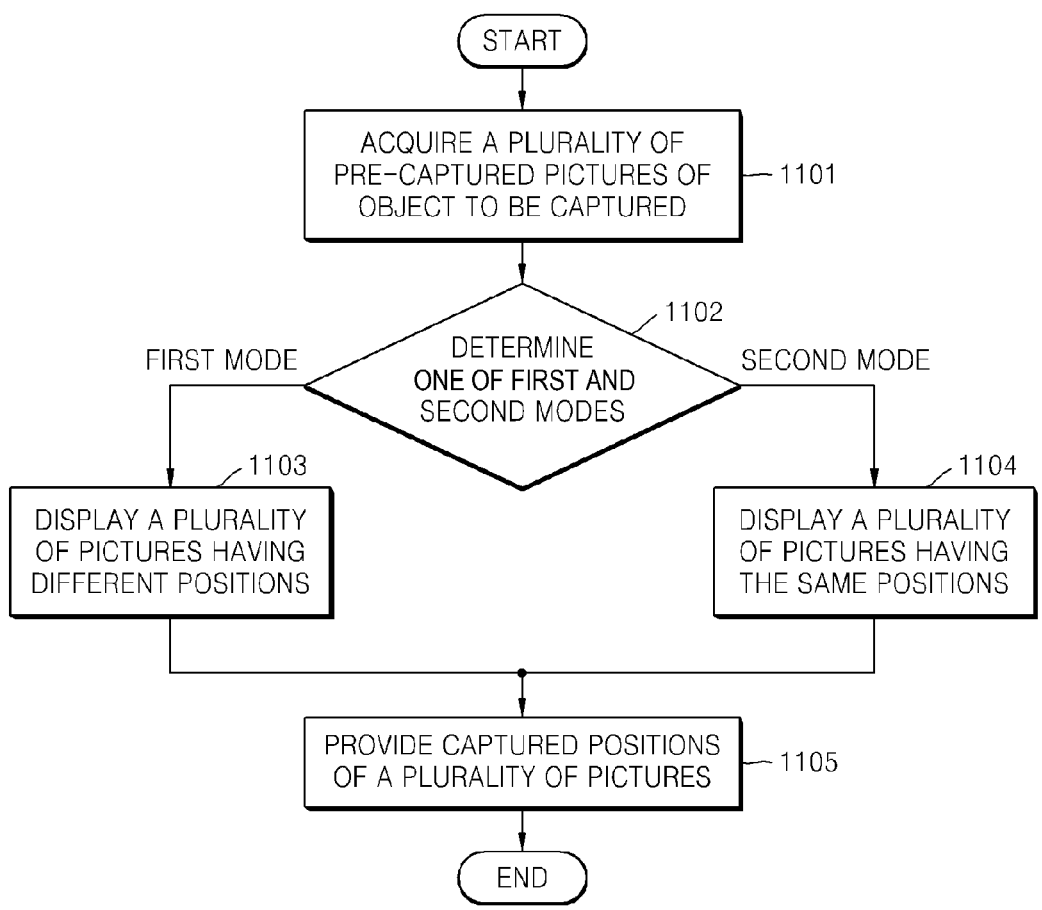
FIG. 11 is a flowchart illustrating a method performed by a digital photographing apparatus to acquire a pre-captured picture, according to another embodiment.

FIG. 11 is a flowchart illustrating a method performed by the digital camera 100 to acquire a pre-captured picture, according to another embodiment. The method may be performed by processing logic (a part or a whole of which is realized by hardware, such as a circuit, a chip, or the like, or software executed in a computer). In the present embodiment, the method is performed by the digital camera 100.

In operation 1101, the digital camera 100 acquires a plurality of pre-captured pictures of an object to be captured. In operation 1102, the digital camera 100 determines a mode to display the plurality of pre-captured pictures. The digital camera 100 provides the plurality of pre-captured pictures in a first or second mode according to the determined mode. A selection of the first or second mode may be determined by a user or may be determined with reference to a function which has been performed by the digital camera 100 before the first or second mode is selected. If the first mode is determined, the digital camera 100 provides a plurality of pictures having different captured positions in operation 1103. Otherwise, if the second mode is determined, the digital camera 100 provides a plurality of pictures having the same captured positions in operation 1104. In operation 1105, the digital camera 100 provides captured positions of the plurality of pre-captured pictures. The captured positions of the plurality of pre-captured pictures may be provided with at least one of the plurality of pre-captured pictures selected by the user may be provided through the display unit 106.

FIG. 12 is a flowchart illustrating a method performed by the server 300 to provide a pre-captured picture, according to an embodiment. The method may be performed by processing logic (a part or a whole of which is realized by hardware, such as a circuit, a chip, or the like, or software executed in a computer). In the present embodiment, the method is performed by the server 300.

In operation 1201, the server 300 receives a picture of an object to be captured from the digital camera 100. In operation 1202, the server 300 determines information for identifying the object from the picture of the object. For example, the server 300 may acquire the object included in the picture using various well-known image recognition algorithms. The server 300 may acquire the information, e.g., a name or an identifier of the object.

In operation 1203, the server 300 acquires at least one pre-captured picture of the object and a captured position of the at least one pre-captured picture from the storage unit 314 of the server using the information. For example, the server 300 may compare the name or identifier of the object with a name or identifier of additional information of a pre-captured picture stored in the storage unit 314 of the server 300 to acquire a pre-captured picture having the same or similar name or identifier. In operation 1204, the server 300 transmits the at least one pre-captured picture and the captured position of the at least one pre-captured picture to the digital camera 100.

According to an exemplary embodiment, a user is provided with at least one pre-captured picture of an object to be captured and a captured position of the at least one pre-captured picture from a digital photographing apparatus. Therefore, the user captures the object in a position appropriate to capture the object. Also, the user refers to the most appropriate picture to capture the object in consideration of a capturer, a captured time, and a priority of the at least one pre-captured picture, etc.

Methods of providing pre-captured images according to embodiments of the present invention may be realized using program commands which may be executed through various computer means and may be recorded on a computer-readable recording medium. The computer-readable recording medium may include a program command, a data file, a data structure in a single form or in a combined form. The program command recorded on the computer-readable recording medium is specifically designed and constituted for the present invention but may be well known to and used by a software developer. Examples of the computer-readable recording medium include a hard disk, a floppy disk, a magnetic media such as a magnetic tape, an optical media such as a compact disc (CD) or a digital versatile disc (DVD), and a hardware device which is particularly constituted to store and execute a program command, such as a ROM, a RAM, a flash memory, or the like. Computer-readable storage media may be distributed over network coupled computer systems so that the machine-readable instructions are stored and/or executed in a distributed fashion. This media can be read by the computer, stored in its memory, and executed by a processor. Examples of the program command include a machine code made by a compiler and a high-level language which may be executed by a computer using an interpreter or the like. The hardware device may operate as at least one software module to execute an operation of the present invention or may perform an opposite function.

Also, using the disclosure herein, programmers of ordinary skill in the art to which this patent pertains can easily implement functional programs, codes, and code segments for making and using the disclosed embodiments.

The embodiments disclosed herein may be described in terms of functional block components and/or methods. Such functional blocks may be realized by any number of hardware and/or software components configured to perform the specified functions. For example, various integrated circuit components, e.g., memory elements, processing elements, logic elements, look-up tables, and the like, may be used to carry out a variety of functions under the control of one or more microprocessors or other control devices. Similarly, where the elements of this disclosure are implemented using software programming and/or software elements, the disclosed embodiments may be implemented with any programming or scripting language such as C, C++, Java, assembler, or the like, with the various algorithms being implemented with any combination of data structures, objects, processes, routines and/or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of the methods described herein can be performed in any suitable order unless otherwise indicated herein and/or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosed embodiments, reference has been made to the embodiments illustrated in the drawings, and specific language has been used to describe these embodiments. However, no limitation of the scope of this disclosure is intended by this specific language, and the claimed inventions should be construed to encompass all embodiments that would normally occur to one of ordinary skill in the art. The terminology used herein is for the purpose of describing the particular embodiments and is not intended to be limiting the embodiments of this patent.

The use of any and all examples, or exemplary language (e.g., "such as") provided herein, is intended merely to better illuminate the claimed inventions and does not pose a limitation on the scope of the claimed inventions unless otherwise claimed. Numerous modifications and adaptations will be readily apparent to those of ordinary skill in this art without departing from the spirit and scope of the claimed inventions. Therefore, the scope of the claimed inventions is defined not by the detailed description but includes all equivalents and differences within the scope of the present disclosure.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing pictures at a digital photographing apparatus, the method comprising:
   generating information for identifying an object to be captured in response to a command to capture the object;
   displaying the captured image of the object;

providing a selection menu that is operable to select one of at least one picture of the object which is captured in a different position and at least one picture of the object which is captured in the same position;

transmitting the information in response to a selection of the selection menu;

acquiring at least one pre-captured picture of the object and a captured position of the at least one pre-captured picture; and providing the at least one pre-captured picture and the captured position, wherein when the at least one picture of the object which is captured in the different position is selected, displaying the captured image of the object in a first region, and displaying one or more thumbnails of the at least one picture of the object which is captured in the different position in a second region, and wherein when the at least one picture of the object which is captured in the same position is selected, displaying the captured image of the object in the first region, and displaying one or more thumbnails of the at least one picture of the object which is captured in the same position in the second region.

2. The method of claim 1, wherein the information comprises at least one of a name, an identifier, and a picture of the object.

3. The method of claim 1, wherein the at least one pre-captured picture comprises first and second pictures which are captured at different positions.

4. The method of claim 1, wherein:
the generation of the information comprises generating a time when the object is captured; and
the acquisition of the at least one pre-captured picture comprises acquiring at least one pre-captured picture captured within a time period determined from the time.

5. The method of claim 1, wherein:
priorities are given to the at least one pre-captured picture; and
the acquisition of the at least one pre-captured picture comprises acquiring at least one picture within a determined priority range.

6. The method of claim 1, wherein the acquisition of the at least one pre-captured picture comprises acquiring at least one picture based on a capturer of the at least one pre-captured picture.

7. The method of claim 1, wherein the provision of the at least one pre-captured picture and the captured position of the at least one pre-captured picture comprises:
generating a map comprising the object; and
displaying the at least one pre-captured picture and the captured position on the map.

8. The method of claim 1, wherein the provision of the at least one pre-captured picture and the captured position comprises updating the captured position of the at least one pre-captured picture in real time according to changes in a position of the digital photographing apparatus.

9. The method of claim 1, wherein:
the information is transmitted to a server through a wired or wireless network using a communication interface of the digital photographing apparatus; and the at least one pre-captured picture of the object and the captured position of the at least one pre-captured picture are acquired from the server through a wired or wireless network using the communication interface of the digital photographing apparatus.

10. A digital photographing apparatus, comprising:
a display unit to display at least one picture of an object to be captured;
a processor; and
a memory,
wherein the processor is configured to
generate information for identifying the object,
display the captured image of the object,
provide a selection menu that is operable to select one of at least one picture of the object which is captured in a different position and at least one picture of the object which is captured in the same position,
acquire at least one pre-captured picture of the object and a captured position of the at least one pre-captured picture,
provide the at least one pre-captured picture and the captured position to the display unit,
generate a picture of the object in response to a command to capture the object, and
store the generated picture in the memory,
wherein when the at least one picture of the object which is captured in the different position is selected, the captured image of the object is displayed in a first region, and one or more thumbnails of the at least one picture of the object which is captured in the different position are displayed in a second region, and
wherein when the at least one picture of the object which is captured in the same position is selected, the captured image of the object is displayed in the first region, and one or more thumbnails of the at least one picture of the object which is captured in the same position are displayed in a second region.

11. The digital photographing apparatus of claim 10, wherein the information comprises at least one of a name, an identifier, and a picture of the object.

12. The digital photographing apparatus of claim 10, wherein the processor is to generate a time when the object is captured, to acquire at least one pre-captured picture captured within a time period determined from the time.

13. The digital photographing apparatus of claim 10, wherein priorities are given to the at least one pre-captured picture, and the processor is to acquire at least one picture within a determined priority range, among the at least one pre-captured picture.

14. The digital photographing apparatus of claim 10, wherein the processor is to acquire at least one picture of the at least one pre-captured picture based on capturers of the at least one pre-captured picture.

15. A non-transitory computer-readable recording medium having embodied thereon a computer program for executing the method of claim 1.

* * * * *